United States Patent
Reinecke

(10) Patent No.: US 10,351,264 B2
(45) Date of Patent: Jul. 16, 2019

(54) ANTI-STALL HYDRAULIC PUMP FOR A THRUST VECTOR CONTROL SYSTEM

(71) Applicant: HAMILTON SUNDSTRAND CORPORATION, Charlotte, NC (US)

(72) Inventor: Mark Reinecke, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 730 days.

(21) Appl. No.: 15/340,746

(22) Filed: Nov. 1, 2016

(65) Prior Publication Data

US 2018/0118378 A1    May 3, 2018

(51) Int. Cl.
  B64G 1/26   (2006.01)
  F04C 14/24  (2006.01)
  F04C 2/10   (2006.01)
  F04C 14/18  (2006.01)
  F15B 7/00   (2006.01)
  F02K 9/84   (2006.01)
  F02K 9/97   (2006.01)

(52) U.S. Cl.
  CPC ............... B64G 1/26 (2013.01); F04C 2/10 (2013.01); F04C 14/18 (2013.01); F04C 14/24 (2013.01); F15B 7/003 (2013.01); F02K 9/84 (2013.01); F02K 9/97 (2013.01); F04C 2270/185 (2013.01); F04C 2270/44 (2013.01); F05D 2260/607 (2013.01); Y02T 50/675 (2013.01)

(58) Field of Classification Search
  CPC . B64G 1/26; F04B 1/324; F04B 1/146; F04B 1/295; F04C 14/24
  See application file for complete search history.

(56) References Cited

U.S. PATENT DOCUMENTS

| | | | |
|---|---|---|---|
| 5,117,633 A | 6/1992 | Bayer | |
| 5,145,324 A * | 9/1992 | Dickes | B64D 41/007 417/222.1 |
| 5,687,907 A | 11/1997 | Holden | |
| 5,771,694 A * | 6/1998 | Houtman | F01B 3/0023 411/55 |
| 6,145,308 A | 11/2000 | Bueche et al. | |
| 6,443,705 B1 * | 9/2002 | Munoz | F04B 1/324 417/222.1 |
| 2005/0178886 A1 * | 8/2005 | Potter | B64G 1/26 244/52 |
| 2011/0162344 A1 * | 7/2011 | Benson | F02C 7/232 60/39.282 |

FOREIGN PATENT DOCUMENTS

WO    0037797    6/2000

OTHER PUBLICATIONS

European Patent Office, European Search Report dated Mar. 26, 2018 in Application No. 17198355.4-1007.

* cited by examiner

Primary Examiner — Philip J Bonzell
Assistant Examiner — Tye William Abell
(74) Attorney, Agent, or Firm — Snell & Wilmer, L.L.P.

(57) ABSTRACT

A thrust vector control system is provided. The thrust vector control system may comprise an anti-stall hydraulic pump configured to deliver hydraulic fluid to at least one actuator, wherein each actuator may be configured to move an exhaust nozzle of a space vehicle. The anti-stall hydraulic pump may provide thermal conditioning to the thrust vector actuation control system during ground operation and/or periods of low output operation.

16 Claims, 3 Drawing Sheets

ANTI-STALL HYDRAULIC PUMP FOR A THRUST VECTOR CONTROL SYSTEM

FIELD

The present disclosure relates to actuation control systems, and more specifically, to a thrust vector control system having an anti-stall hydraulic pump.

BACKGROUND

The attitude of various types of vehicles, such as, for example, waterborne vehicles, airborne vehicles, space vehicles (e.g., multi-stage rockets, etc.), and/or the like, can be controlled using various control surfaces, exhaust nozzles, and/or the like. For example, in various vehicles, control along the roll, pitch, and yaw axes may be implemented using exhaust nozzles. In that regard, a thrust vector control system may be implemented to aid in control of the exhaust nozzles. The direction of thrust may be controlled by the thrust vector control system to effect a change in attitude of the vehicle, such as, for example, by changing the orientation of one or more exhaust nozzles. Each exhaust nozzle may be configured to be moveable along the yaw and pitch axes, and one or more hydraulic actuators from the thrust vector control system may be provided to move each nozzle as desired.

Typically, the thrust vector control system may include thermal conditioning of the hydraulic components to prevent cold spots and fluid freezing during ground operations. This may be accomplished with an electric motor pump that is dedicated to thermal conditioning of the thrust vector control system. However, the electric motor pump and associated components (e.g., electrical wiring, hydraulic lines, and/or group support equipment) remains on the vehicle during travel. On a space vehicle, physical space and vehicle weight may be at a premium, thus the addition of extraneous components is undesirable.

SUMMARY

In various embodiments, a thrust vector control system is disclosed. The thrust vector control system may comprise a yaw actuator, a pitch actuator, and an anti-stall hydraulic pump. The anti-stall hydraulic pump may be configured to provide a hydraulic fluid to the yaw actuator and the pitch actuator. The anti-stall hydraulic pump may comprise a swash plate configured to vary a displacement of the anti-stall hydraulic pump. The anti-stall hydraulic pump may also comprise an override piston configured to increase a force against the swash plate to decrease the displacement of the anti-stall hydraulic pump.

In various embodiments, the anti-stall hydraulic pump may comprise a gerotor pump. In various embodiments, an anti-stall valve may be configured to monitor an output pressure of hydraulic fluid discharged from the gerotor pump, wherein the anti-stall valve is in fluid communication with the override piston. In various embodiments, in response to the output pressure of hydraulic fluid decreasing to a preset speed threshold, the anti-stall valve may move to an open position to allow a flow of hydraulic fluid to the override piston. In various embodiments, the thrust vector control system may comprise a TVCS controller configured to transmit a nozzle actuator activation signal to the yaw actuator and the pitch actuator. In various embodiments, the TVC pitch actuator may comprise a TVC pitch actuator position sensor and the TVC yaw actuator may comprise a TVC yaw actuator position sensor. In various embodiments, the TVCS controller may be configured to change the nozzle actuator activation signal in response to receiving a position sensor data from the TVC pitch actuator position sensor and the TVC yaw actuator position sensor.

In various embodiments, a space vehicle is disclosed. The space vehicle may comprise a main body, an exhaust nozzle, and a thrust vector control system. The exhaust nozzle may be configured to propel the main body. The thrust vector control system may be configured to control the exhaust nozzle. The thrust vector control system may comprise a yaw actuator, a pitch actuator, and an anti-stall hydraulic pump. The yaw actuator may be coupled to the exhaust nozzle and may be configured to move the exhaust nozzle relative to a yaw axis. The pitch actuator may be coupled to the exhaust nozzle and may be configured to move the exhaust nozzle relative to a pitch axis. The anti-stall hydraulic pump may be configured to provide a hydraulic fluid to the yaw actuator and the pitch actuator. The anti-stall hydraulic pump may comprise a swash plate configured to vary a displacement of the anti-stall hydraulic pump. The anti-stall hydraulic pump may also comprise an override piston configured to increase a hydraulic fluid force against the swash plate to decrease the displacement of the anti-stall hydraulic pump.

In various embodiments, the anti-stall hydraulic pump may comprise a gerotor pump. In various embodiments, the space vehicle may further comprise an anti-stall valve configured to monitor an output pressure of hydraulic fluid discharged from the gerotor pump, wherein the anti-stall valve is in fluid communication with the override piston. In various embodiments, in response to the output pressure of hydraulic fluid decreasing to a preset speed threshold, the anti-stall valve may move to an open position to allow a flow of hydraulic fluid to the override piston. In various embodiments, the thrust vector control system may comprise a TVCS controller configured to transmit a nozzle actuator activation signal to the yaw actuator and the pitch actuator. In various embodiments, the TVC pitch actuator may comprise a TVC pitch actuator position sensor and the TVC yaw actuator may comprise a TVC yaw actuator position sensor. In various embodiments, the TVCS controller may be configured to change the nozzle actuator activation signal in response to receiving a position sensor data from the TVC pitch actuator position sensor and the TVC yaw actuator position sensor.

In various embodiments, a thrust vector control system is disclosed. The thrust vector control system may comprise a yaw actuator configured to move an exhaust nozzle along a yaw axis, a pitch actuator configured to move the exhaust nozzle along a pitch axis, and an anti-stall hydraulic pump configured to provide a hydraulic fluid to the yaw actuator and the pitch actuator. The anti-stall hydraulic pump may comprise a swash plate configured to vary a displacement of the anti-stall hydraulic pump. The anti-stall hydraulic pump may comprise a gerotor pump. The anti-stall hydraulic pump may comprise an anti-stall valve fluidly coupled to the gerotor pump. The anti-stall hydraulic pump may comprise an override piston in fluid communication with the anti-stall valve and configured to increase a force against the swash plate to decrease the displacement of the anti-stall hydraulic pump.

In various embodiments, the anti-stall valve may be configured to monitor an output pressure of hydraulic fluid discharged from the gerotor pump. In various embodiments, in response to the output pressure of hydraulic fluid decreasing to a preset speed threshold, the anti-stall valve may move to an open position to allow a flow of hydraulic fluid to the override piston. In various embodiments, the thrust vector control system may comprise a TVCS controller configured to transmit a nozzle actuator activation signal to the yaw actuator and the pitch actuator. In various embodiments, the TVC pitch actuator may comprise a TVC pitch actuator position sensor and the TVC yaw actuator may comprise a TVC yaw actuator position sensor. In various embodiments, the TVCS controller may be configured to recalibrate the nozzle actuator activation signal in response to receiving a position sensor data from the TVC pitch actuator position sensor and the TVC yaw actuator position sensor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
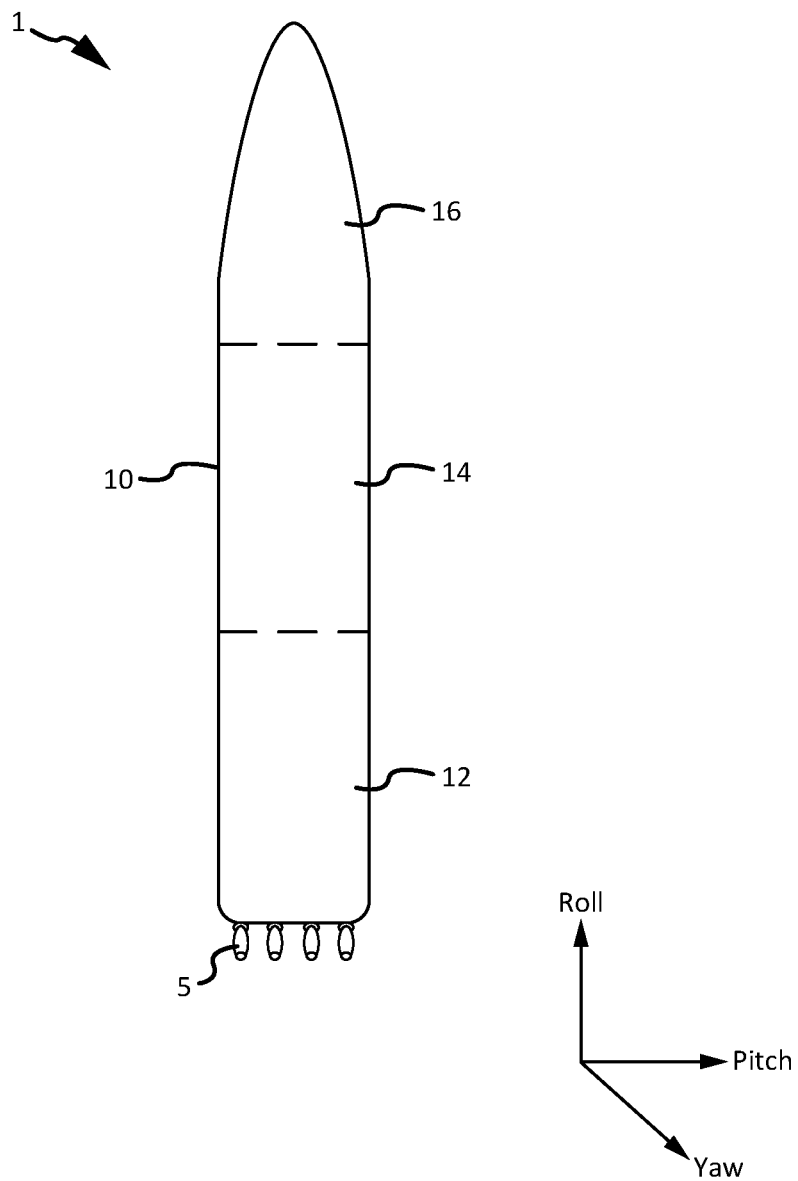
FIG. 1 illustrates a side view of a space vehicle, in accordance with various embodiments.

In various embodiments, and with reference to FIG. 1, a simplified side view of a space vehicle 1 is depicted. It is to be appreciated that the disclosure is not limited to use in conjunction with a particular type of engine, or for a particular type of vehicle. Thus, although the disclosure, for convenience of explanation, is depicted and described as being implemented in space vehicle 1, it will be appreciated that it can be implemented in various other types of vehicles, systems, and/or environments. In various embodiments, space vehicle 1 may comprise a multi-stage rocket having a main body 10 divided into two or more stages stacked on top of each other. For example, and in various embodiments, space vehicle 1 may comprise a first stage 12, a second stage 14, and/or a third stage 16. Each stage 12, 14, and 16 may include one or more engines (e.g., a solid rocket propellant engine, and/or the like) that may activate in succession to propel space vehicle 1. For example, first stage 12 may be used during take-off of space vehicle 1, before separating from main body 10 (e.g., after a predetermined amount of time and/or after a predetermined event). Second stage 14 may then activate to continue propulsion of space vehicle 1, before separating from main body 10 (e.g., after a second predetermined amount of time and/or after a second predetermined event). Third stage 16 may then activate to continue propulsion of space vehicle 1.

In various embodiments, each stage 12, 14, and 16 may comprise at least one exhaust nozzle 5 configured to provide engine exhaust. Exhaust nozzles 5 may be spaced equidistantly (or at any desired configuration) about a rear wall of each stage 12, 14, and 16. For example, FIG. 1 depicts a plurality of exhaust nozzles 5 spaced about a rear wall of first stage 12. During flight of space vehicle 1, it may be desirable to alter and/or correct flight trajectory. In that respect, each exhaust nozzle 5 in each stage 12, 14, and 16 may be movably mounted within its respective stage, and each exhaust nozzle 5 may be configured to provide attitude control of space vehicle 1 along at least the pitch and/or yaw axes. In various embodiments, and with brief reference to FIGS. 1 and 2, altering and/or correcting the flight trajectory of space vehicle 1 may be accomplished via a thrust vector control system ("TVCS") 100. In various embodiments, space vehicle 1 may also comprise a separate TVCS 100 for each stage 12, 14, and 16, or may comprise any other suitable number of TVCS 100. As discussed further below, TVCS 100 may comprise at least one actuator (e.g., TVC pitch actuator 145 and TVC yaw actuator 155) coupled to each exhaust nozzle 5, and configured to move the corresponding exhaust nozzle 5 to correct and/or alter trajectory of space vehicle 1.

Figure 2:
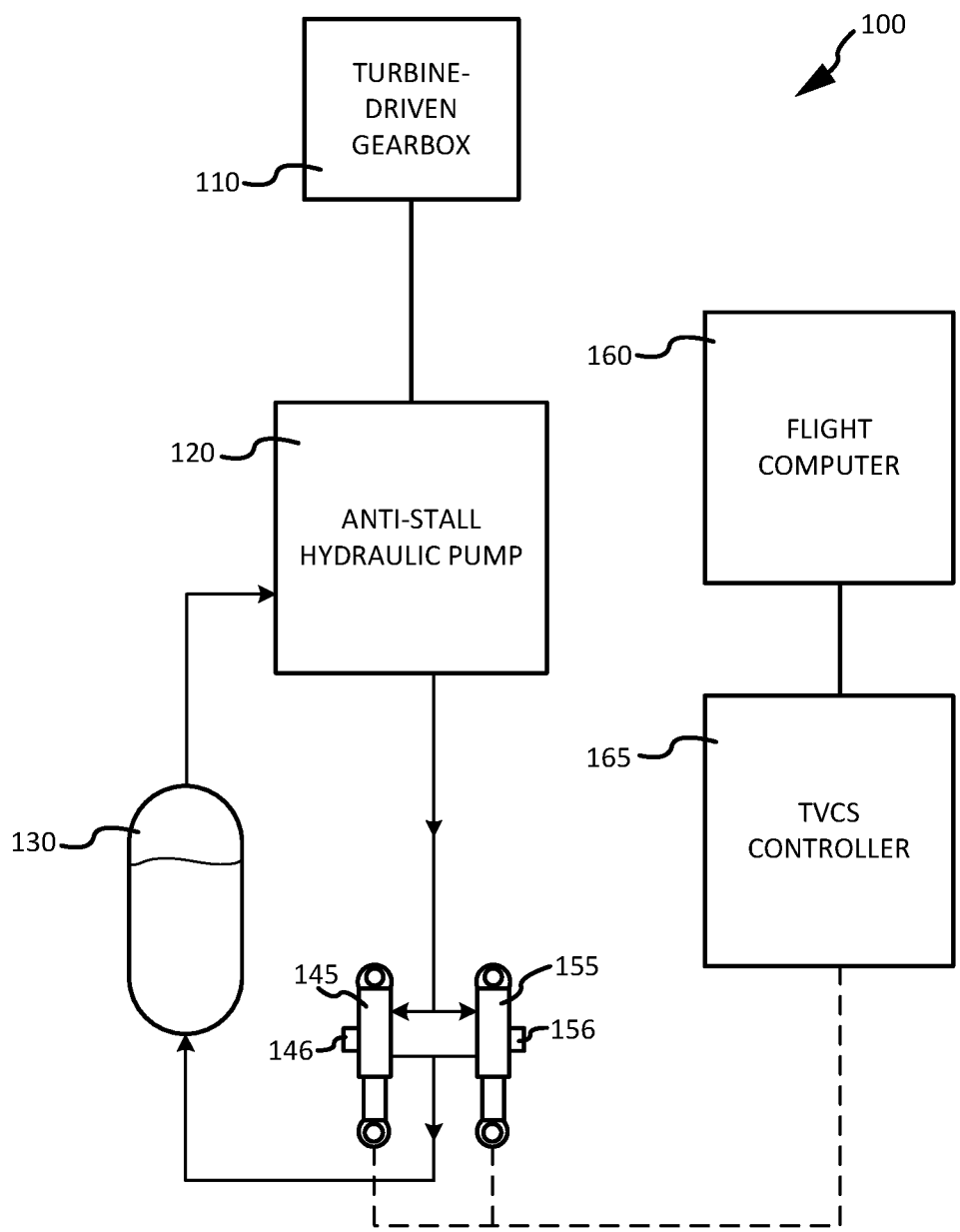
FIG. 2 illustrates a thrust vector control system having an anti-stall hydraulic pump, in accordance with various embodiments.

In various embodiments, and with reference to FIG. 2, a simplified schematic of a TVCS 100 is depicted. TVCS 100 may comprise a turbine-driven gearbox 110, an anti-stall hydraulic pump 120, a hydraulic fluid reservoir 130, a TVC pitch actuator 145, a TVC yaw actuator 155, a flight computer 160, and/or a TVCS controller 165. Turbine-driven gearbox 110 may provide mechanical power to anti-stall hydraulic pump 120 to enable anti-stall hydraulic pump 120 to deliver hydraulic fluid through TVCS 100. In various embodiments, hydraulic fluid reservoir 130 may comprise a hydraulic fluid (e.g., hydraulic oil, and/or the like). The hydraulic fluid may be pressurized in hydraulic fluid reservoir 130, and/or through TVCS 100, by a pressurized gas, such as, for example, by an inert gas (e.g., helium), hydrogen gas, and/or the like. The pressurized hydraulic fluid may be delivered through TVCS 100 via anti-stall hydraulic pump 120, as discussed in further detail below. In that regard, anti-stall hydraulic pump 120 may comprise the primary pump in TVCS 100. The pressurized hydraulic fluid may be delivered to each of the nozzle actuators (e.g., TVC pitch actuator 145 and TVC yaw actuator 155), and/or to any other suitable TVCS 100 component.

In various embodiments, TVC pitch actuator 145 (a first actuator) and TVC yaw actuator 155 (a second actuator) may comprise any suitable type of actuator, such as, for example, an electrohydraulic servo actuator. Actuators 145, 155 may also comprise various components to aid in actuation, such as, for example, at least one electrically-operated servo-valve, at least one actuator ram, and/or the like. Actuators 145, 155 may be configured to receive a nozzle actuator activation signal from TVCS controller 165. The nozzle actuator activation signal may comprise commands to actuate the actuators 145, 155. In various embodiments, the nozzle actuator activation signal may comprise separate commands to actuate each actuator 145, 155 along both the yaw axis and the pitch axis (e.g., the nozzle actuator activation signal may comprise a yaw activation signal and a pitch activation signal). In response to receiving the nozzle actuator activation signal, actuators 145, 155 may urge the pressurized hydraulic fluid to move the corresponding exhaust nozzle 5 in accordance with the nozzle actuator activation signal.

In various embodiments, TVC pitch actuator 145 may comprise a TVC pitch actuator position sensor 146 and TVC yaw actuator 155 may comprise a TVC yaw actuator position sensor 156. Each position sensor 146, 156 may comprise any suitable type of position sensor, such as, for example, rotary variable differential transformers, linear variable differential transformers, potentiometers, eddy current sensors, and/or the like. Position sensors 146, 156 may be in logical communication (e.g., wired and/or wirelessly coupled) with TVCS controller 165. Position sensors 146, 156 may be configured to transmit data to TVCS controller 165, such as, for example, a position sensor data. In that respect, each position sensor 146, 156 may include at least one sensor for measuring and/or determining avionics data such as altitude, pitch, roll, yaw, vertical speed, space vehicle velocity (airspeed and/or groundspeed), space vehicle acceleration, and/or the like. Because each actuator 145, 155 is coupled to an exhaust nozzle 5 (with brief reference to FIG. 1), position sensors 146, 156 may also gather data relating to the position of each exhaust nozzle 5. Position sensors 146, 156 may transmit the position sensor data to TVCS controller 165.

In various embodiments, TVCS controller 165 may be in logical communication (e.g., wired and/or wirelessly coupled) with TVC pitch actuator 145 and/or TVC yaw actuator 155, and/or with flight computer 160. TVCS controller 165 may include one or more processors and one or more tangible, non-transitory computer-readable mediums, and may be capable of implementing logic. The processor may be a general purpose processor, a digital signal processor (DSP), an application specific integrated circuit (ASIC), a field programmable gate array (FPGA) or other programmable logic device, discrete gate or transistor logic, discrete hardware components, or a combination thereof. In various embodiments, TVCS controller 165 may be configured to receive and/or transmit the nozzle actuator activation signal. In that respect, TVCS controller 165 may receive the nozzle actuator activation signal from flight computer 160 (as discussed further below), and transmit the nozzle actuator activation signal to actuators 145, 155. In various embodiments, TVCS controller 165 may also be configured to receive the position sensor data from actuators 145, 155, and/or transmit the position sensor data to flight computer 160 for analysis.

In various embodiments, flight computer 160 may be configured to receive the position sensor data from TVCS controller 165. In that regard, flight computer 160 may be in logical communication (e.g., wired and/or wirelessly coupled) with TVCS controller 165. Flight computer 160 may analyze the position sensor data to determine whether additional movement along the yaw axis and/or pitch axis is desired. In response to a determination that additional movement along the yaw axis and/or pitch axis is desired, flight computer 160 may transmit a nozzle actuator activation signal to TVCS controller 165. In that respect, flight computer 160 (or TVCS controller 165, in various embodiments) may change the nozzle actuator activation signal in response to the position sensor data. Flight computer 160 may comprise any suitable processor capable of receiving, processing, and/or transmitting data, such as, for example, the position sensor data. In that regard, flight computer 160 may be located onboard space vehicle 1 and/or located externally from space vehicle 1.

Figure 3:
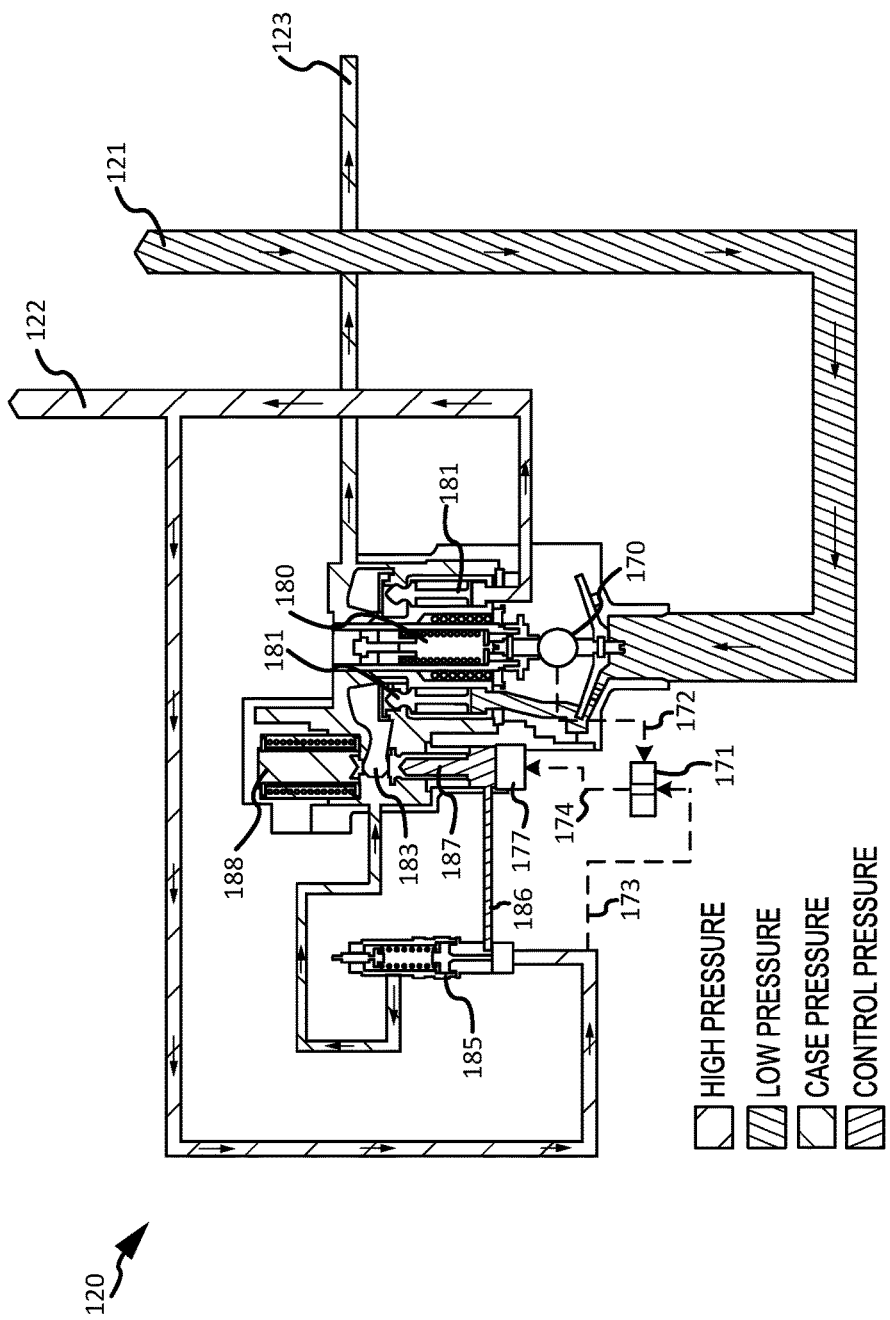
FIG. 3 illustrates an anti-stall hydraulic pump for a thrust vector control system, in accordance with various embodiments.

In various embodiments, and with reference to FIG. 3, anti-stall hydraulic pump 120 is depicted in further detail. Anti-stall hydraulic pump 120 may comprise a variable displacement hydraulic pump. In various embodiments, anti-stall hydraulic pump 120 may comprise one or more outlet pipes and inlet pipes. For example, anti-stall hydraulic pump 120 may comprise an inlet 121 configured to receive and provide the hydraulic fluid for anti-stall hydraulic pump 120 (e.g., inlet 121 may receive the hydraulic fluid from hydraulic fluid reservoir 130, with brief reference to FIG. 2). Anti-stall hydraulic pump 120 may also comprise an outlet 122 configured to provide the hydraulic fluid to TVCS 100 components (e.g., to TVC pitch actuator 145 and TVC yaw actuator 155, with brief reference to FIG. 2). Anti-stall hydraulic pump 120 may also comprise any other suitable outlets, such as, for example, a case drain (or low pressure) outlet 123. In various embodiments, a barrel cylinder 180 may receive hydraulic fluid from inlet 121. Pistons 181 may translate within the barrel cylinder 180 to pressurize the hydraulic fluid and deliver high pressure hydraulic fluid through outlet 122.

In various embodiments, a swash plate 183 may be in contact with pistons 181 and may change the angle in which pistons 181 run to vary the displacement of anti-stall hydraulic pump 120, thus varying the output flow of hydraulic fluid. Swash plate 183 may receive a first force from a pressure compensator 188, and a second, opposite force from a pressure control piston 187. Pressure compensator 188 may be in contact with swash plate 183 and may provide spring force against swash plate 183. A decrease in force provided by pressure control valve 185 to pressure control piston 187 may cause greater displacement in anti-stall hydraulic pump 120 to increase the flow of hydraulic fluid through outlet 122. For example, during normal operation, an increase in external hydraulic flow demand causes a drop in fluid pressure in anti-stall hydraulic pump 120. A pressure control valve 185 may monitor the fluid pressure, and in response to the drop in fluid pressure, pressure control valve 185 may decrease the pressure of hydraulic fluid to pressure control piston 187, via pressure passage 186, thus causing pressure control piston 187 to decrease the second force against swash plate 183, enabling a greater displacement in anti-stall hydraulic pump 120 to increase the flow of hydraulic fluid through outlet 122.

Typically, traditional hydraulic pumps for thrust vector control systems may operate in full stroke as output pressure drops (e.g., in response to torque demand being greater than available torque), causing the hydraulic pump to stall. In various embodiments, anti-stall hydraulic pump 120 may provide thermal conditioning for TVCS 100 during ground operations (e.g., during times of reduced input power) while also preventing the hydraulic pump from stalling as output pressure drops. In that regard, anti-stall hydraulic pump 120 may comprise various components to provide anti-stall capabilities. In various embodiments, anti-stall hydraulic pump 120 may comprise a gerotor pump 170. Gerotor pump 170 may comprise a small, fixed displacement pump having a fluid output pressure directly proportional to the speed of the hydraulic fluid. Gerotor pump 170 may receive the hydraulic fluid from inlet 121, and may deliver the hydraulic fluid into anti-stall valve 171.

In various embodiments, anti-stall hydraulic pump 120 may comprise an anti-stall valve 171. Anti-stall valve 171 may be configured to monitor the output pressure of hydraulic fluid from gerotor pump 170, that is proportional to anti-stall hydraulic pump 120 rotational speed. In that respect, anti-stall valve 171 may be coupled to gerotor pump 170 or may be separate from, and in fluid communication with, gerotor pump 170. In various embodiments, anti-stall valve 171 may be in fluid communication with gerotor pump 170 via an anti-stall control circuit 172. Anti-stall valve 171 may comprise a valve, orifice, and/or the like, capable of monitoring the output pressure of the hydraulic fluid from gerotor pump 170.

In various embodiments, and in response to the monitored output pressure of gerotor pump 170 dropping to a preset speed threshold (e.g., above a speed threshold which may be dependent on operational factors), anti-stall valve 171 may be configured to move to an opened position to allow for the flow of hydraulic fluid through anti-stall valve 171. For example, anti-stall valve 171 may be configured to receive hydraulic fluid from an anti-stall inlet 173, and may allow for the output of hydraulic fluid through an anti-stall outlet 174 and to an override piston 177. In response to receiving the hydraulic fluid, override piston 177 may increase force against swash plate 183. The increase in force against swash plate 183 from override piston 177, may exceed the first force from pressure compensator 188, thus causing anti-stall hydraulic pump 120 to move into a smaller displacement level, and thereby lowering the output of hydraulic fluid from anti-stall hydraulic pump 120. As the stroke is decreased, the required drive torque in anti-stall hydraulic pump 120 may drop until an equilibrium is achieved. In that regard, destroking anti-stall hydraulic pump 120 may allow hydraulic fluid to circulate through the system (TVCS 100) during ground operation (e.g., during times of reduced input power), and thus thermally condition TVCS 100 components, without having anti-stall hydraulic pump 120 stall and/or operate at threshold speeds.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust vector control system, comprising:
  a yaw actuator;
  a pitch actuator; and
  an anti-stall hydraulic pump to provide a hydraulic fluid to the yaw actuator and the pitch actuator, the anti-stall hydraulic pump comprising:
    a gerotor pump;
    a swash plate configured to vary a displacement of the anti-stall hydraulic pump;

an override piston configured to increase a force against the swash plate to decrease the displacement of the anti-stall hydraulic pump; and an anti-stall valve configured to monitor an output pressure of hydraulic fluid discharged from the gerotor pump, wherein the anti-stall valve is in fluid communication with the override piston, the anti-stall valve being fluidly operated.

2. The thrust vector control system of claim 1, wherein in response to the output pressure of hydraulic fluid decreasing to a preset speed threshold, the anti-stall valve moves to an open position to allow a flow of hydraulic fluid to the override piston.

3. The thrust vector control system of claim 1, further comprising a thrust vector control system (TVCS) controller configured to transmit a nozzle actuator activation signal to the yaw actuator and the pitch actuator.

4. The thrust vector control system of claim 3, wherein the pitch actuator comprises a thrust vector control (TVC) pitch actuator position sensor and the yaw actuator comprises a thrust vector control (TVC) yaw actuator position sensor.

5. The thrust vector control system of claim 4, wherein the TVCS controller is configured to change the nozzle actuator activation signal in response to receiving a position sensor data from the TVC pitch actuator position sensor and the TVC yaw actuator position sensor.

6. A space vehicle, comprising:
a main body;
an exhaust nozzle configured to propel the main body; and
a thrust vector control system configured to control the exhaust nozzle, the thrust vector control system comprising:
  a yaw actuator coupled to the exhaust nozzle and configured to move the exhaust nozzle relative to a yaw axis;
  a pitch actuator coupled to the exhaust nozzle and configured to move the exhaust nozzle relative to a pitch axis; and
  an anti-stall hydraulic pump configured to provide a hydraulic fluid to the yaw actuator and the pitch actuator, the anti-stall hydraulic pump comprising:
    a gerotor pump;
    a swash plate configured to vary a displacement of the anti-stall hydraulic pump;
    an override piston configured to increase a hydraulic fluid force against the swash plate to decrease the displacement of the anti-stall hydraulic pump; and
    an anti-stall valve configured to monitor an output pressure of hydraulic fluid discharged from the gerotor pump, wherein the anti-stall valve is in fluid communication with the override piston, the anti-stall valve being fluidly operated.

7. The space vehicle of claim 6, wherein in response to the output pressure of hydraulic fluid decreasing to a preset speed threshold, the anti-stall valve moves to an open position to allow a flow of hydraulic fluid to the override piston.

8. The space vehicle of claim 6, further comprising a thrust vector control system (TVCS) controller configured to transmit a nozzle actuator activation signal to the yaw actuator and the pitch actuator.

9. The space vehicle of claim 8, wherein the pitch actuator comprises a thrust vector control (TVC) pitch actuator position sensor and the yaw actuator comprises a thrust vector control (TVC) yaw actuator position sensor.

10. The space vehicle of claim 9, wherein the TVCS controller is configured to recalibrate the nozzle actuator activation signal in response to receiving a position sensor data from the TVC pitch actuator position sensor and the TVC yaw actuator position sensor.

11. A thrust vector control system, comprising:
a yaw actuator configured to move an exhaust nozzle along a yaw axis;
a pitch actuator configured to move the exhaust nozzle along a pitch axis; and
an anti-stall hydraulic pump configured to provide a hydraulic fluid to the yaw actuator and the pitch actuator, the anti-stall hydraulic pump comprising:
  a swash plate configured to vary a displacement of the anti-stall hydraulic pump;
  a gerotor pump;
  an anti-stall valve fluidly coupled to the gerotor pump, the anti-stall valve being fluidly operated; and
  an override piston in fluid communication with the anti-stall valve and configured to increase a force against the swash plate to decrease the displacement of the anti-stall hydraulic pump.

12. The thrust vector control system of claim 11, wherein the anti-stall valve is configured to monitor an output pressure of hydraulic fluid discharged from the gerotor pump.

13. The thrust vector control system of claim 12, wherein in response to the output pressure of hydraulic fluid decreasing to a preset speed threshold, the anti-stall valve moves to an open position to allow a flow of hydraulic fluid to the override piston.

14. The thrust vector control system of claim 11, further comprising a thrust vector control system (TVCS) controller configured to transmit a nozzle actuator activation signal to the yaw actuator and the pitch actuator.

15. The thrust vector control system of claim 14, wherein the pitch actuator comprises a thrust vector control (TVC) pitch actuator position sensor and the yaw actuator comprises a thrust vector control (TVC) yaw actuator position sensor.

16. The thrust vector control system of claim 15, wherein the TVCS controller is configured to recalibrate the nozzle actuator activation signal in response to receiving a position sensor data from the TVC pitch actuator position sensor and the TVC yaw actuator position sensor.

* * * * *